Dec. 8, 1925.

R. P. BROWN

METER

Filed Dec. 17, 1924    3 Sheets-Sheet 1

1,564,519

INVENTOR
RICHARD P. BROWN
BY
J. E. Hubbell
ATTORNEY

Dec. 8, 1925.

R. P. BROWN

METER

Filed Dec. 17, 1924

INVENTOR
RICHARD P. BROWN
BY
J. E. Hubbell
ATTORNEY

Patented Dec. 8, 1925.

1,564,519

UNITED STATES PATENT OFFICE.

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

METER.

Application filed December 17, 1924. Serial No. 756,475.

*To all whom it may concern:*

Be it known that I, RICHARD P. BROWN, a citizen of the United States, and resident of Philadelphia, in the county of Philadelphia and State of Pennsylvania, have invented certain new and useful Improvements in Meters, of which the following is a specification.

The general object of the present invention is to provide improved means for supporting and housing the meter element proper of a meter instrument such as an indicating or recording electric pyrometer. More specifically, the object of my invention is to provide simple and effective means for rigidly supporting a galvanometer or like sensitive and delicate meter element proper in a protective casing in the normal operation of the instrument with provisions for opening said casing and making the meter element proper readily available for inspection, adjustment or repairs when necessary.

To this end, in the preferred practical use of my invention, I employ a fixed housing or casing member, and hinge to the latter a part which forms a door for the casing chamber, and I mount the meter element or elements if the instrument comprises more than one such element, on the inner side of the door, slotting the latter for the passage of the meter pointer or pointers. On the front of the hinged door or support I mount the instrument scale, and in the case of a recording instrument, I also mount on the exterior of the door, the mechanism for supporting and advancing the record surface and the mechanism cooperating therewith in making a record. When, as is usual in recording instruments, the record advancing and marking mechanism includes a motor, that motor is preferably attached to the free edge of the hinged door or support.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter, in which I have illustrated and described a preferred embodiment of my invention.

Figure 1:
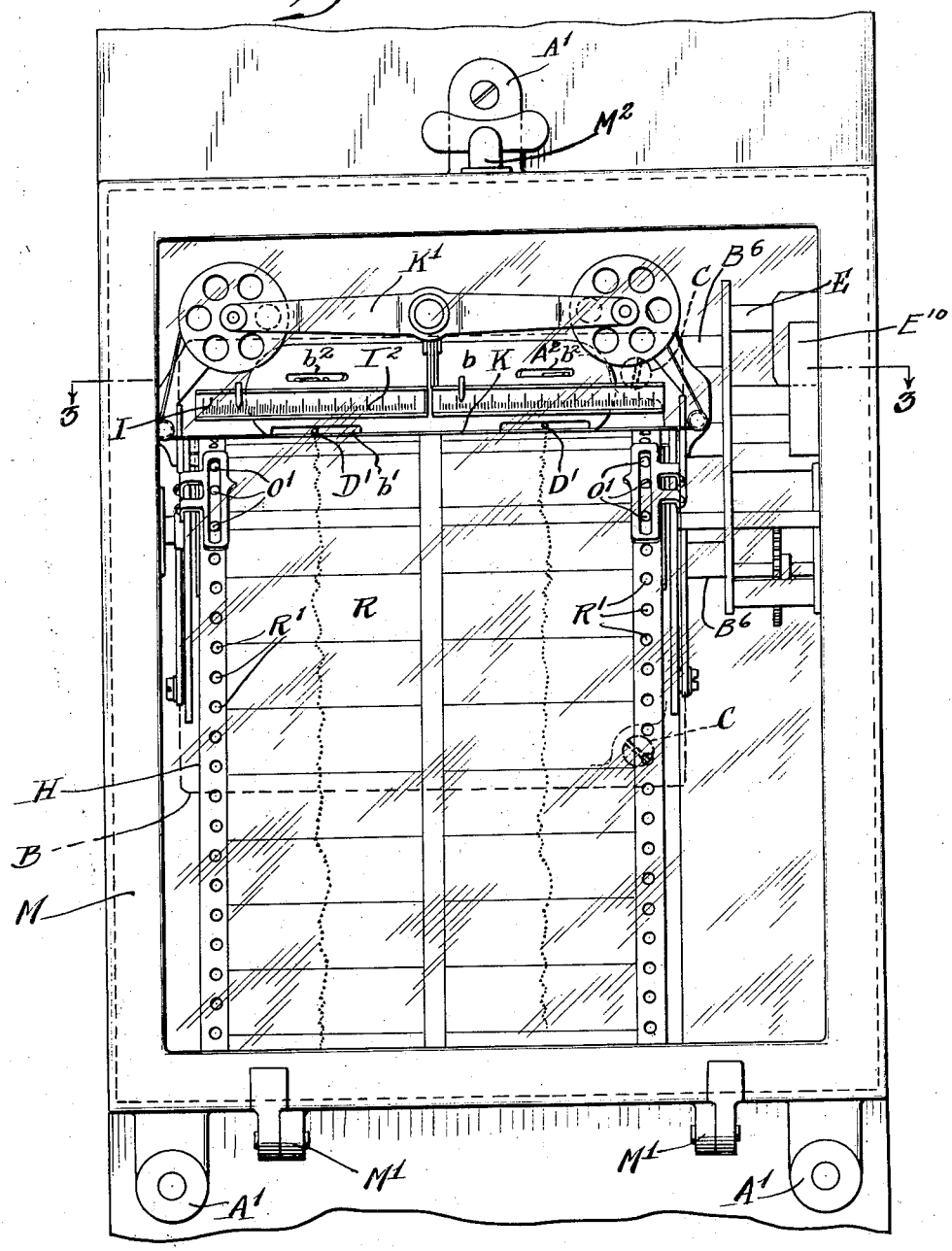
Fig. 1 is a front elevation of a recording instrument.

In the drawings, I have illustrated a duplex recording instrument primarily devised for use in simultaneously recording two different temperatures. The instrument housing comprises a base member A shown as formed with lugs A' for attachment to a wall or instrument panel board. The housing member A is formed at its front side with a box-like chamber $A^3$ open at its front end but normally closed by a door member B, which forms the meter element support and is hinge-connected to the member A. As shown, the hinge connections comprise hinge lugs B' carried at one side edge of the door, hinge lugs $A^2$ formed on the base member A, and connecting hinge pintles. Advantageously, the member B is formed with an in-turned marginal flange $B^2$ machined to fit snugly against the machined front edges $A^4$ of the top, bottom, and side walls of the chamber $A^3$. In the normal operating condition of the apparatus, the door B is preferably rigidly held in place, as by means of stud bolts C passing through holes $B^4$ in the member B, and received in threaded sockets $A^5$ formed in lugs of the base member A.

Figure 3:
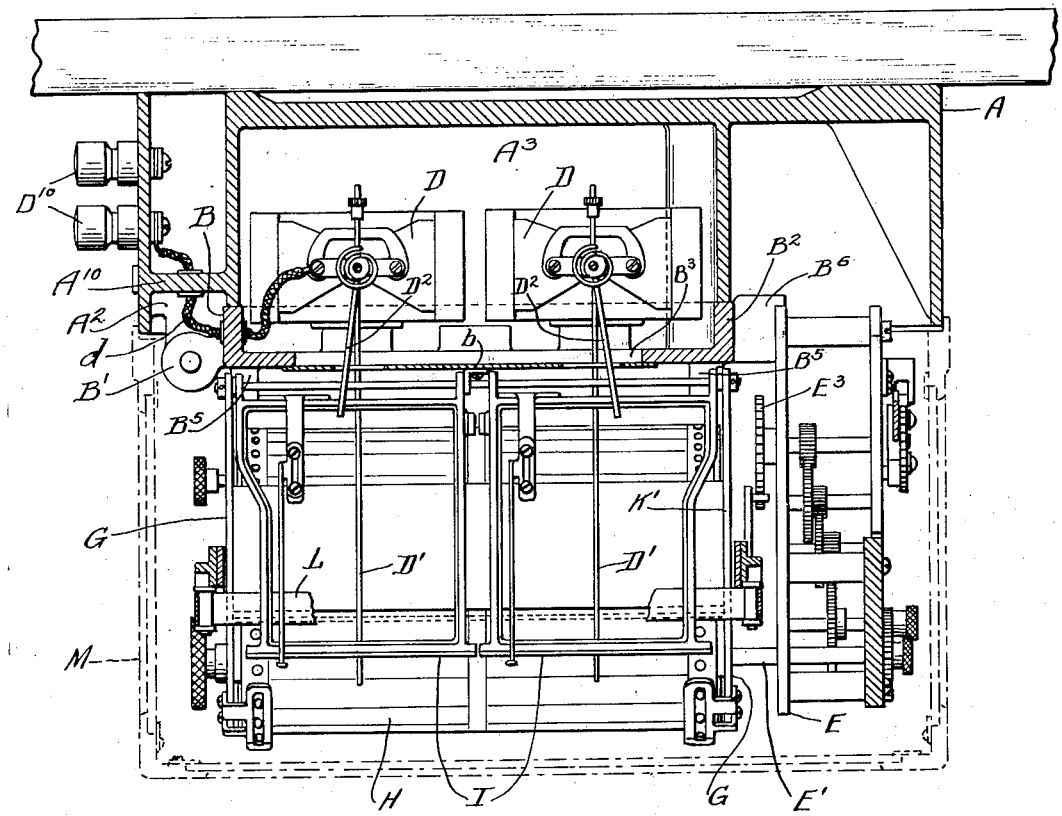
Fig. 3 is a cross section on the line 3—3 of Fig. 1.
Figure 4:
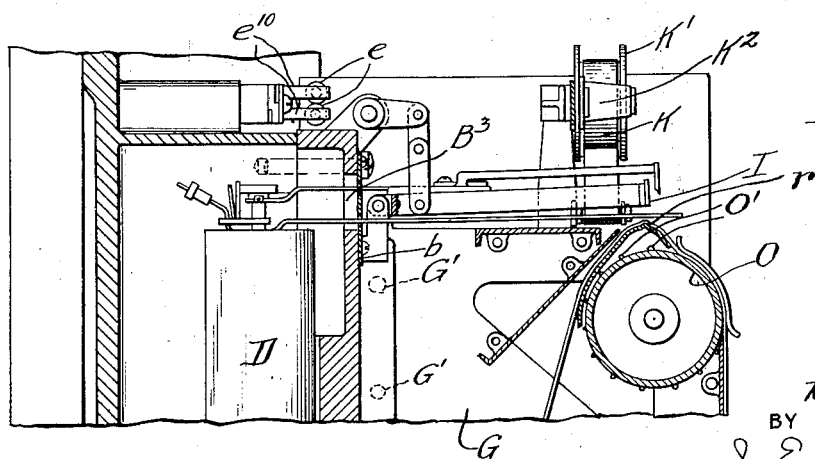
Fig. 4 is a sectional side elevation of a portion of the instrument.

As shown, the two meter elements D, which may be and are shown as similar to one another, are suitably secured to the member B at the inner side of the latter, so that, as shown best in Fig. 3, the major portions of the meter elements are received within the chamber $A^3$ in the normal condition of the apparatus. The member B is suitably slotted for the passage of the meter pointers D'. For convenience and to facilitate the practical manufacture of the instrument with pointer slots as small as practical, a large opening $B^3$ is formed in the support member B, and a cover is provided for this opening in the form of a sheet metal plate $b$ suitably attached to the member B. The plate $b$ is formed with narrow slots $b'$ of the minimum required length, through which the pointers $D'$ extend. In the particular construction illustrated, additional slots $b^2$ are also formed in the cover plate $b$ for the usual adjusting devices $D^2$, one for each meter element, employed to adjust the movable systems of the meter elements, when necessary, to bring the instrument pointers $D'$ each to its proper zero or open circuit position. This method of mounting the adjusting devices $D^2$ is convenient but is not an essential feature of the present invention.

In the particular form of recording instrument shown, a paper strip record sheet R is advanced beneath the free ends of the meter pointers $D'$ by suitable record sheet supporting and feeding mechanism. The latter, as shown, comprises a feed roll O mounted in a supporting frame comprising side plates G screwed to the frame member B as by means of screws $G'$ threaded into sockets in ribs $B^5$ on the front side of the member B. The feed roll is formed with the usual sprocket teeth $O'$ at its ends, which enter apertures $R'$ formed for the purpose in the record sheet at the edges of the latter. The feed roll O is rotated, and the other instrumentalities essential to the formation of a record may be driven by a suitable motor mechanism E which may well include an electrical clock motor $E^{10}$ proper, mounted on the member B. As shown, the frame work for the motor mechanism E is secured to lugs $B^6$ formed on the free edge of the member B.

When the motor proper of the motor mechanism E is an electric motor, as shown, the terminals $c$ of the latter may advantageously be arranged to co-operate with energizing spring contacts $e^{10}$ carried by the housing member A in such position that the contacts $e$ engage the corresponding contacts $e^{10}$ when the support B is in its closed position, and when the member B is moved to open the meter element chamber $A^3$, the circuit will be broken. $E^{20}$ are the binding posts to which the contacts $e^{10}$ are connected. The leads for the motor elements D advantageously comprise flexible portions $d$ which extend from the hinged edge of the member B to the adjacent portion of the stationary housing part A. As shown, also, the housing part A is formed with a web-like portion $A^{10}$ connecting the side wall of the chamber $A^3$ adjacent its front end with the adjacent outer rim portion of the member A thus providing an enclosed space into which the lead portions $d$ extend and in which they may be connected to the inner ends of the binding posts $D^{10}$.

The character of the provisions for supporting and feeding the record surface and for making a record thereon form no part of the present invention, which indeed in its broader aspects may not include any such mechanism at all, but may be embodied in a simple indicating instrument. The mechanism actually shown in the drawings for supporting the record sheet R comprises a novel arrangement of parts characterized by the fact that the record becomes visible as soon as made or very shortly thereafter, and forming the subject matter of an application for patent Serial No. 756,435, filed by me on December 17, 1924.

In the instrument illustrated in the drawings, records are made by depressing the pointers $D'$ at regular intervals into engagement with the portion of the record sheet R above a supporting straight edge $r$, or more accurately, into engagement with a transfer ribbon K interposed between the instrument pointers and the record sheet, the depressor mechanism comprising a hinged depressor member I operated by the motor E. The depressor mechanism including the provisions by which it is operated by the motor E may advantageously be of the form disclosed and claimed in the application of George W. Grisdale for Letters Patent, Serial No. 671,962, filed October 31, 1923. Advantageously, also, the transfer ribbon runs between rolls $K'$ carried by a frame $K^2$ which is reciprocated back and forth in timed relation to the operation of the depressor mechanism to advance the transfer ribbon K into position for making a record and then retract it to make the record immediately visible. The supporting frame $K^2$ for the transfer ribbon is advanced and retracted, and the ribbin itself is fed through suitable connections to the motor E, but this portion of the instrument illustrated need not be further described as it really forms no part of the present invention, and is moreover, fully described and claimed in the application for patent Serial No. 671,963, filed October 31, 1923. It is to be noted that indicating scales $I^2$, (Fig. 1) one for each of the pointers $D'$ are formed on the front edge of the depressor mechanism.

Advantageously, a cover M having a glass window in its front wall is provided for normally enclosing all of the movable parts mounted on the member D. As shown, the cover M is hinged to the member A at $M'$ and is normally secured in place by a securing device $M^2$. As shown, the housing part A is in the form of a box open at its front except as it is closed by the cover M, and is larger than the chamber $A^3$ about which it extends.

Figure 2:
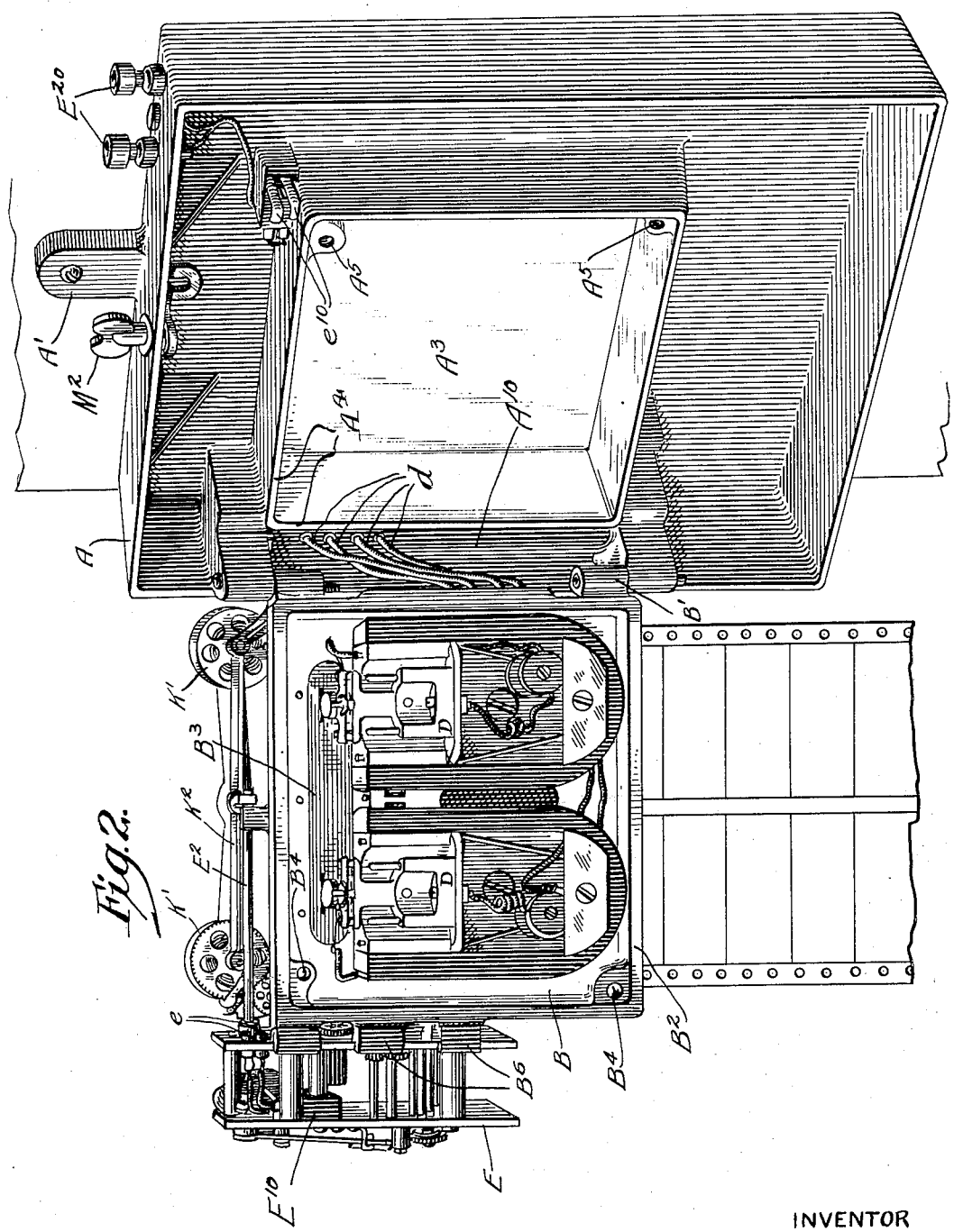
Fig. 2 is a perspective view of the instrument with the casing opened to expose the meter elements.

With the described construction of the instrument housing, the delicate and sensitive meter element or elements are normally enclosed and protected against injurious mechanical contact in a casing chamber $A^3$ which may be made practically dust and moisture proof. Furthermore, in the operative condition of the instrument, the meter element support B is rigidly secured to the stationary housing part A and in proper relation thereto. The housing part A and the meter element support B may be made of cast metal of ample strength and rigidity. The member B may be disconnected from the part A when necessary or desirable to facilitate the assembly or disassembly of the instrument. By removing the stud bolts C the interior of the casing may be opened quickly and easily, and when the member B is swung into the open position shown in Fig. 2, all parts of the instrument are accessible for inspection, adjustment and repair, and moreover, are still supported in a manner which permits adjustment and repairs to be made with less liability to injurious contact of the delicate parts of the instrument with external agencies liable to injure them, than would be the case if the support B were not then hinge connected to the casing A.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. In an electrical recorder, the combination with a sensitive electrical meter having a deflecting pointer, of a housing for said meter comprising a base adapted to be secured to a supporting structure, a member normally extending across the front of said base and having said meter secured to its rear side and being formed with a slot through which the meter pointer projects, recording mechanism co-operating with the meter pointer and secured to the front side of the last mentioned member, and a hinge connection between said base and said member permitting the latter to be swung away from the base to render said meter accessible.

2. The combination with the apparatus of claim 1 of the driving motor for said recording mechanism mounted on said member at the edge of the latter opposite said hinge connection.

3. The apparatus of claim 1 further characterized by the relative shaping of said base and member to provide a meter receiving recess between said base and member.

Signed at New York city, in the county of New York, and State of New York, this 16 day of December, A. D. 1924.

RICHARD P. BROWN.